United States Patent Office 3,387,058
Patented June 4, 1968

3,387,058
FUSIBLE AND INFUSIBLE POLYMERS FROM CARBOCYCLIC AROMATIC POLYCARBOXYLIC PHENYL ESTERS AND CARBOCYCLIC AROMATIC TETRAMINES
Harold H. Levine, San Diego, Calif., assignor to Whittaker Corporation, a corporation of California
No Drawing. Continuation-in-part of application Ser. No. 238,697, Nov. 19, 1962. This application Dec. 23, 1963, Ser. No. 332,971
18 Claims. (Cl. 260—823)

The present application is a continuation-in-part of my co-pending United States patent application Ser. No. 238,697, filed Nov. 19, 1962, and now abandoned in favor of U.S. patent application Ser. No. 561,645 filed June 27, 1966.

The present invention relates to a novel cross-linked polymer and the process of producing this composition. More particularly, the present invention relates to novel cross-linked condensation polymers and still more particularly to novel cross-linked polybenzimidazoles. The present invention also relates to copolymers and terpolymers which comprise cross-linked polybenzimidazoles.

One of the significant developments which has occurred relatively recently in the field of condensation polymers has been the synthesis of polybenzimidazoles. At first, these polymers, while interesting from a scientific standpoint, had only limited utility because of their substantial infusibility which could not be prevented by known polymerization techniques. Polymers of this type are disclosed in United States Patent No. 2,895,948. A substantial improvement in the polymerization of polybenzimidazoles is disclosed in my copending application Ser. No. 238,697, filed Nov. 19, 1962, which is incorporated by reference herein. This application discloses, broadly, that diphenyl esters of aromatic discarboxylic acids may be reacted with aromatic tetramines to a degree short of substantial infusibility. Thus, this application discloses for the first time polybenzimidazoles which can be used in conventional plastic forming, coating and laminating equipment and processing. After being formed, these fusible polybenzimidazoles may be cured into final products having excellent high temperature properties as compared with other known polymers.

However, there has been an increasing need for polymers which are able to retain high strengths at increasingly higher temperatures. While the polybenzimidazoles disclosed in my copending application Ser. No. 238,697 perform extremely well at temperatures up to and somewhat above 700° F., they have a tendency to undergo drastic decreases in strength properties, e.g., tensile shear strength and flexural strength at temperatures substantially higher than 700° F., e.g., temperatures of about 900 to 1000° F. and higher.

It is an object of this invention to provide a novel and valuable polymeric material and the process of making this material.

Another object of the present invention is to provide a novel cross-linked condensation polymer.

It is a further object of the present invention to provide a cross-linked polybenzimidazole and the process of making this material.

It is still another object of the present invention to provide a fusible polybenzimidazole which has been prepared by the use of an aromatic polycarboxylic phenyl ester having a functionality greater than two and the process of making this polymer.

It is an additional object of this invention to provide copolymers and terpolymers which comprise cross-linked polybenzimidazoles.

Other objects and advantages of the present invention, it is believed, will be apparant from the following description of specific embodiments thereof.

Briefly, the present invention comprises the condensation of an aromatic tetramine and an aromatic polycarboxylic phenyl ester having a functionality greater than two. Preferably, these compounds are condensed to a degree short of substantial infusibility to produce a fusible polybenzimidazole. This fusible polymer may then be used in forming, coating, laminating, etc., operations and cured to form a polymer which has excellent high temperature properties. The aromatic tetramines used in the practice of the present invention are bis-(ortho-diamino) aromatic compounds, e.g., 3,3'-diaminobenzidine. The aromatic polycarboxylic phenyl esters having a functionality greater than two may be trifunctional, e.g., triphenyl trimesate, tetrafunctional, e.g., 3,5,8,10-tetraphenyl pyrene tetracarboxylate, or may have functionalities greater than four. Single ring, multi-ring, fused ring and heterocyclic aromatic esters may be used in the practice of the present invention. Preferably, the condensation is performed in an inert atmosphere or a vacuum by heating to temperatures ranging from 150° C. to 400° C., with the preferred range being 200° C. to 275° C.

The present invention also includes copolymers and terpolymers in which polymers and copolymers produced according to application Ser. No. 238,697 are combined with polymers produced with phenyl esters having a functionality greater than two. For example, copolymers may be prepared from an aromatic tetramine, a diphenyl ester of an aromatic dicarboxylic acid and an aromatic polycarboxylic phenyl ester having a functionality greater than two. A specific example of such a copolymer would be that produced from 3,3'-diaminobenzidine, diphenylisophthalate and triphenyltrimesate. An example of a terpolymer which could be prepared according to the present invention would be the product of the condensation of an aromatic tetramine with two different diphenyl esters and a phenyl ester having a functionality greater than two. A specific example of such a terpolymer would be that produced by reacting 3,3'-diamino-benzidine, diphenylisophthalate, diphenylterephthalate and triphenyltrimesate.

Furthermore, it has been found that unexpectedly superior high temperature strength properties may be obtained when the terpolymers of the present invention are prepared by separately synthesizing the diphenyl ester copolymer and the trimesate polymer and then mixing the copolymer and polymer to form a terpolymer. For example, 3,3'-diaminobenzidine may be reacted with diphenylisophthalate and diphenylterephthalate to form a copolymer. 3,3'-diaminobenzidine is then separately reacted with triphenyltrimesate to form a polybenzimidazole polymer. The isophthalate-terephthalate copolymer may then be mixed with the trimesate polymer to form a terpolymer. This terpolymer may then be formed and cured to produce a cross-linked polybenzimidazole. Similarly, copolymers having improved properties may be produced by first reacting an aromatic tetramine and a diphenyl ester of an aromatic carboxylic acid and separately reacting an aromatic tetramine with an aromatic polycarboxylic phenyl ester having a functionality greater than two. These polymers may then be combined to form a copolymer. Still further, it has been found that copolymers and terpolymers having somewhat improved properties may be produced by delaying addition of the ester having a functionality greater than two until there has been some reaction between the diphenyl ester and the aromatic tetramine. These improved copolymers and terpolymers are believed to be a separate and distinct inventive aspect of the present invention.

The present invention is further illustrated by the following examples.

Example 1

A thorough mixture was prepared from 16.05 grams (0.075 mole) of 3,3'-diaminobenzidine and 21.90 grams (0.05 mole) of triphenyltrimesate in a 100 ml. flask fitted with a nitrogen inlet and vacuum adapter. The system was purged several times by alternate evacuation and flushed with nitrogen.

The mixture was heated in an oil bath for 9.5 minutes at 250° C. under nitrogen. The flask was then removed from the bath and cooled to room temperature in vacuo.

A prepolymer yield of 31.23 grams was obtained which had a polymer melt temperature of about 180° C.–185° C. This prepolymer had an inherent viscosity of 0.072 as measured in a 0.5% solution in dimethyl sulfoxide. The inherent viscosities described in each of the subsequent examples were measured in the same manner.

Example 2

A thorough mixture of 14.98 grams (0.07 mole) of 3,3'-diaminobenzidine, 12.72 grams (0.04 mole) of diphenylisophthalate and 8.76 grams (0.02 mole) of triphenyltrimesate was prepared in a 100 ml. flask fitted with a gas inlet tube and a vacuum adapter. The system was purged several times by alternate evacuation and flushing with nitrogen. After heating for 11 minutes at about 255° C. in an oil bath, the flask was removed from the bath and cooled under reduced pressure.

The yield of precopolymer was 30 grams and had a polymer melt temperature of about 170° C.–175° C. with an inherent viscosity of 0.06.

Example 3

A three neck 150 ml. flask was fitted with a sealed stirrer, nitrogen inlet and vacuum adapter. The flask was charged with an intimate mixture consisting of 15.73 grams (0.074 mole) of 3,3'-diaminobenzidine, 12.72 grams (0.04 mole) of diphenylisophthalate, 6.36 grams (0.02 mole) of diphenylterephthalate and 3.94 grams (0.009 mole) of triphenyltrimesate. This mixture contained 15 mole percent of triphenyltrimesate. The system was purged several times by alternate evacuation and flushing with nitrogen. The contents of the flask were heated in an oil bath for 11 minutes at about 260° C. under nitrogen with stirring. The flask was then removed from the oil bath, evacuated and allowed to cool to room temperature.

The yield of preterpolymer was 31.27 grams and had a polymer melt temperature of about 170° C.–175° C. with an inherent viscosity of 0.055.

Example 4

A mixture of 86.6 grams (0.4 mole) of 3,3'-diaminobenzidine, 84.9 grams (0.267 mole) of diphenylisophthalate and 42.3 grams (0.133 mole) of diphenylterephthalate was thoroughly mixed and added to a 500 ml. three neck flask equipped with a sealed stirrer, nitrogen inlet and vacuum adapter. The system was purged several times by alternate evacuation and flushing with nitrogen. After heating in an oil bath for 13 minutes at about 255° C. under nitrogen with stirring, the flask was removed from the bath and allowed to cool under vacuum.

The yield of precopolymer was 165 grams and had a polymer melt temperature of about 195° C.–200° C. and and inherent viscosity of 0.062.

Example 5

The prepolymers prepared according to Examples 1–3 and a physical mixture of the prepolymers of Examples 1 and 4 containing 15 mole percent triphenyltrimesate were tested for tensile shear strength properties at various temperatures. Solutions containing 35% of these prepolymers in pyridine were prepared. To these solutions was added a weight of finely powdered aluminum equal to the weight of the prepolymer. The resulting slurry was constantly stirred to maintain a homogeneous suspension.

Stainless steel coupons comprising 17–7 PH Stainless Steel were degreased with a suitable solvent, scoured with an abrasive detergent, rinsed and dried. The cleaned steel was then etched for two minutes at 185° F. in a bath consisting of 841 parts (vol.) of 35% hydrochloric acid, 89 parts (vol.) of 85% phosphoric acid and 43 parts (vol.) of 60% hydrofluoric acid. After thorough rinsing with water, the steel was rapidly dried.

A thin coating of the polymer slurry was applied to the bonding surfaces and air dried for several minutes. This was repeated a second time. A proper size of heat cleaned glass fabric (112 weave) was placed on one surface. Two additional coats of polymer slurry were applied to the glass fabric, allowing some air drying time in between each coating. The coated adherants were heated for about 45 minutes at 80° C.–90° C. at 90 inches mercury pressure. The bonds were assembled in a 0.5 inch overlap curing fixture and inserted into a press preheated to 325° C. and left for an hour at 200 p.s.i. After cooling to room temperature, the bonds were post-cured at 400° C. for six hours under vacuum.

The bonded coupons were then tested for tensile shear strength at various temperatures after exposure in air to these temperatures for the times indicated in the following table. The results of these tests are set forth in the following table.

TABLE 1

| Test Conditions | Trimesate Prepolymer Example 1 Average, p.s.i. | Trimesate Copolymer Example 2 Average, p.s.i. | Trimesate (15 mole Percent) Trepolymer Example 3 Average, p.s.i. | Physical Mixture (15 mole Percent Trimesate) Terpolymer from Examples 1 and 4 Average, p.s.i. |
|---|---|---|---|---|
| Room Temperature | 2,225 | 3,650 | 3,295 | 4,370 |
| 1 hr. at 700° F | 1,690 | 2,675 | 2,785 | 3,160 |
| ½ hr. at 900° F | 1,374 | 1,750 | 1,782 | 1,713 |
| 1 hr. at 900° F | 678 | 1,300 | 1,230 | 1,529 |
| ½ hr. at 1,000° F | 711 | 1,080 | 1,069 | 1,300 |
| 1 hr. at 1,000° F | 276 | 584 | 564 | 1,095 |

Note.—All tests were made at temperature after the indicated exposure times in air.

It will be readily apparent to those skilled in the art that the results in this table establish that the trimesate polymer of Example 1 has excellent high temperature properties as compared with polymers other than polybenzimidazoles. In addition, the copolymer and terpolymer of Examples 2 and 3 exhibit properties which are substantially better than those of the polymer of Example 1, particularly at higher temperatures. Unexpectedly, the terpolymer comprising a mixture of the polymers of Examples 1 and 4 demonstrates properties which are superior even to those of the terpolymer of Example 3, particularly at a temperature of 1000° F.

From the foregoing, it is apparent that the present invention provides cross-linked polybenzimidazoles which have excellent properties as well as copolymers and terpolymers comprising cross-linked polybenzimidazoles which have high temperature properties which are markedly superior to those of linear polybenzimidazoles such as those disclosed in application Ser. No. 238,697. The proportion of phenyl esters having a functionality greater than two in the copolymers and terpolymers of the present invention may be varied according to the properties which it is desired to impart to the finished product. Thus, the present invention makes it possible to tailor the properties of the copolymer or terpolymer to the specific end use to which these materials are to be put. In general, the proportion of the phenyl ester which has a functionality greater than two which is used in the present invention should be at least that which is sufficient to effectively cross-link the copolymer or terpolymer.

While the cross-linked polybenzimidazole of the present invention does not possess high temperature strength characteristics which are as good as those possessed by copolymers and terpolymers which comprise cross-linked polybenzimidazoles, the rigidity of the cured cross-linked polybenzimidazole makes it particularly suitable for various uses where this property is important. For example, the cross-linked polybenzimidazole of the present invention may be used to fabricate molded parts which have high rigidity and excellent high temperature strength properties.

The polybenzimidazoles of the present invention, as well as copolymers and terpolymers comprising cross-linked polybenzimidazoles may be cured by applying heat and pressure in any of the manners known to those skilled in the art. Since it is possible to produce compositions having varying properties according to the present invention, the necessary curing temperature and pressure may vary accordingly. However, curing temperatures of 325° C. and curing pressures of 200 p.s.i. have been found suitable for many of the compositions coming within the scope of the present invention.

The properties of the cross-linked polybenzimidazoles of the present invention may also be varied to some extent by the choice of aromatic polycarboxylic phenyl ester having a functionality greater than 2. Any such esters may be used. In addition to those previously described, tetraphenyl-4,4′,4″,4‴-tetraphenylmethane tetracarboxylate may be used.

The fusibility of the prepolymers of the present invention will, of course, depend upon the degree of completion of the polymerization reaction. In general, but not by way of limitation, the polymerization is performed such that the polymer is fusible at temperatures up to about 500° F. Such polymers may be used in conventional forming and laminating processes and equipment. The fusibility of the prepolymers of the present invention renders them capable of wetting the surfaces to which they are to be bonded. This wetting is essential for adhesion to many substrates. These prepolymers may then be cured to produce substantially infusible polymers as previously described.

Having fully described the present invention, it is to be understood that it is not to be limited to the details set forth, but is of the full scope of the appended claims.

I claim:

1. A process comprising reacting a carbocyclic aromatic tetramine with a carbocyclic aromatic polycarboxylic aromatic polycarboxylic phenyl ester having an ester functionality greater than 2 at a temperature of from about 150° C. to about 400° C. to produce a substantially fusible polybenzimidazole product.

2. The process of claim 1 wherein said reaction is carried out at a temperature of from about 200° C. to about 275° C.

3. The process of claim 1 wherein said aromatic tetramine is 3,3′-diaminobenzidine and said ester is triphenyl trimesate.

4. The process of claim 1 wherein said aromatic tetramine is 3,3′-diaminobenzidine and said ester is 3,5,8,10-tetraphenyl pyrene tetracarboxylate.

5. The process of claim 1 wherein said tetramine is 3,3′-diaminobenzidine and said ester is tetraphenyl-4,4′,4″,4‴-tetraphenylmethane tetracarboxylate.

6. A process comprising reacting at least one diphenyl ester of carbocyclic aromatic dicarboxylic acid with a carbocyclic aromatic tetramine and a carbocyclic aromatic polycarboxylic phenyl ester having an ester functionality greater than 2 at a temperature of from about 150° C. to about 400° C. to produce a substantially fusible polybenzimidazole product.

7. The process comprising reacting at least one diphenyl ester of a carbocyclic aromatic acid with a carbocyclic aromatic tetramine at a temperature from about 150° C. to about 400° C. to produce a fusible linear polybenzimidazol, reacting a carbocyclic aromatic polycarboxylic phenyl ester having an ester functionality greater than 2 with a carbocyclic aromatic tetramine at a temperature of from about 150° C. to about 400° C. to produce a second polybenzimidazole, and mixing said linear polybenzimidazole and said second polybenzimidazole.

8. A process comprising the steps of reacting at least one diphenyl ester of a carbocyclic aromatic dicarboxylic acid with a carbocyclic aromatic tetramine at a temperature from about 150° C. to about 400° C. to produce a fusible linear polybenzimidazole, reacting a carbocyclic aromatic tetramine with a carbocyclic aromatic polycarboxylic phenyl ester having an ester functionality greater than 2 as a temperature from about 150° C. to about 400° C. to produce a second polybenzimidazole, mixing said linear polybenzimidazole and said second polybenzimidazole, said second polybenzimidazole being present in an amount sufficient to be capable of effectively cross-linking said mixture, and curing said mixture at a temperature of at least about 325° C. and a pressure of at least about 200 p.s.i.

9. A process comprising reacting a carbocyclic aromatic tetramine with a carbocyclic aromatic polycarboxylic phenyl ester having an ester functionality greater than 2 at a temperature from about 150° C. to about 400° C. to form a fusible polybenzimidazole product, and curing the product of said reacting step at a temperature of at least about 325° C. and a pressure of at least about 200 p.s.i.

10. The process of claim 9 wherein said carbocyclic aromatic tetramine is 3,3′-diaminobenzidine and said carbocyclic aromatic polycarboxylic phenyl ester is triphenyl trimesate.

11. The process of claim 9 wherein said carbocyclic aromatic tetramine is 3,3′-diaminobenzidine and said carbocyclic aromatic polycarboxylic phenyl ester is 3,5,8,10-tetraphenyl pyrene tetracarboxylate.

12. The process of claim 9 wherein said carbocyclic aromatic tetramine is 3,3′-diaminobenzidine and said carbocyclic aromatic polycarboxylic phenyl ester is tetraphenyl-4,4′,4″,4‴-tetraphenylmethane tetracarboxylate.

13. A process comprising reacting at least one diphenyl ester of a carbocyclic aromatic dicarboxylic acid with a carbocyclic aromatic tetramine and a carbocyclic aromatic polycarboxylic phenyl ester having an ester functionality greater than 2 at a temperature from about 150° C. to about 400° C. to form a fusible product, and curing the fusible product of said reacting step at a temperature of at least about 325° C. and a pressure of at least about 200 p.s.i.

14. A substantially fusible polybenzimidazole product produced by reacting a carbocyclic aromatic tetramine with a carbocyclic aromatic polycarboxylic phenyl ester having an ester functionality greater than 2 at a temperature from about 150° C. to about 400° C.

15. A cured polybenzimidazole product produced by curing a substantially fusible benzimidazole prepared by reacting a carbocyclic aromatic tetramine with a carbocyclic aromatic polycarboxylic phenyl ester having an ester functionality greater than 2 at a temperature from about 150° C. to about 400° C., at a temperature of at least from 325° C. and a pressure of at least about 200 p.s.i.

16. The product of claim 14 wherein said aromatic tetramine is 3,3'-diaminobenzidine and said ester is triphenyl trimesate.

17. The product of claim 14 wherein said aromatic tetramine is 3,3'-diaminobenzidine and said ester is 3,5,8,10-tetraphenyl pyrene tetracarboxylate.

18. The product of claim 14 wherein said tetramine is 3,3'-diaminobenzidine and said ester is tetraphenyl-4,4',4'',4'''-tetraphenylmethane tetracarboxylate.

References Cited

UNITED STATES PATENTS

| | | | |
|---|---|---|---|
| 2,341,611 | 2/1944 | Hagedorn et al. | 260—78 |
| 2,374,354 | 4/1945 | Kaplan | 260—78 |
| 2,502,548 | 4/1950 | Allen et al. | 260—78 |
| 2,895,948 | 7/1959 | Brinker et al. | 260—78 |
| 3,174,947 | 3/1965 | Marvel et al. | 260—78 |
| 3,179,634 | 4/1965 | Edwards | 260—78 |
| 3,260,691 | 7/1966 | Lavin et al. | 260—78 |

FOREIGN PATENTS 570,858  7/1945  Great Britain.

OTHER REFERENCES

Vogel et al.—Journal of Polymer Science, vol. 50, 1961, pp. 511, 512, 513, 518, 528 and 532 relied on. Copy in Group 140.

WILLIAM H. SHORT, *Primary Examiner.*

REUBEN EPSTEIN, CARL D. QUARFORTH, BENJAMIN R. PADGETT, *Examiners.*

L. S. SEBASTIAN, H. D. ANDERSON,
*Assistant Examiners.*